March 14, 1944. R. B. DAY ET AL 2,344,290
HYDROCARBON CONVERSION
Filed Aug. 26, 1940
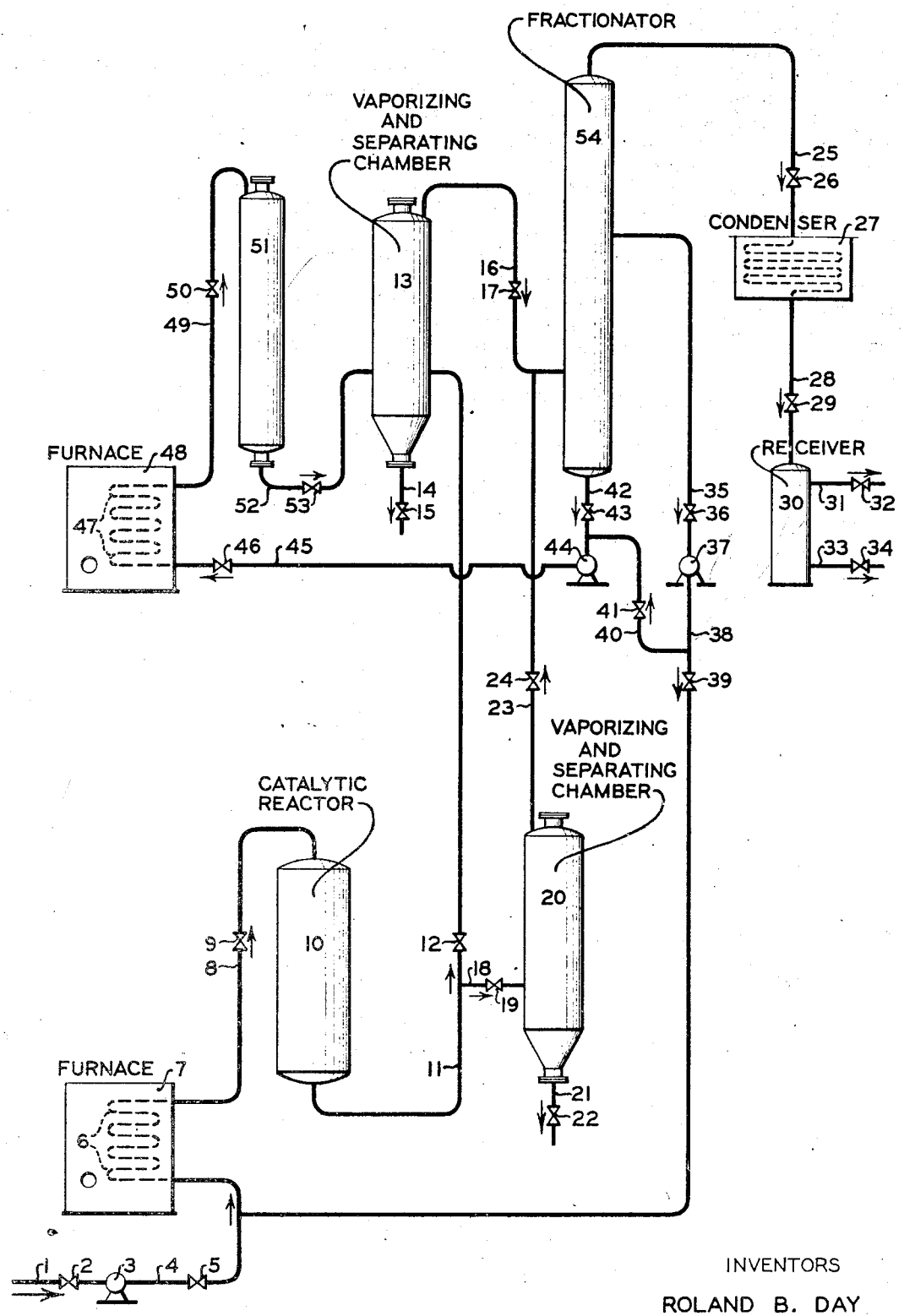
INVENTORS
ROLAND B. DAY
ELMER R. KANHOFER
BY *Lee J. Gary*
ATTORNEY Patented Mar. 14, 1944

2,344,290

UNITED STATES PATENT OFFICE 2,344,290

HYDROCARBON CONVERSION

Roland B. Day and Elmer R. Kanhofer, Chicago, Ill., assignors to Universal Oil Products Company, Chicago, Ill., a corporation of Delaware Application August 26, 1940, Serial No. 354,183

7 Claims. (Cl. 196—49)

This invention relates to a process for the production of gasoline from hydrocarbon oils heavier than gasoline and more specifically to a process for cracking the hydrocarbon oil employing both catalytic and thermal methods whereby to obtain high yields of gasoline with a relatively small amount of carbon formation in the catalytic conversion step.

Catalytic cracking as commercially conducted does not employ recycling of insufficiently converted products to the conversion zone because, as has been found, such insufficiently converted hydrocarbons contain a high percentage of aromatics, cyclo-olefins, cyclo-diolefins, and diolefin hydrocarbon compounds, the tendency of which is to deposit great amounts of carbon or carbonaceous substances upon the catalyst particles if recycled to the catalyst zone resulting in a more rapid lowering of catalyst activity than is encountered when passing clean unconverted oils in contact with such catalysts. In order to reduce the formation of carbonaceous substances during conversion resulting in shorter reactivation times and lower peak reactivating temperatures, it is usual to pass the hydrocarbon oil in contact with the catalyst only once and then thermally crack the insufficiently converted oils in a thermal cracking system. In a process employing both thermal and catalytic cracking in the manner above mentioned, the yield and octane of the gasoline product is good but is not as good as one might expect from a process wherein the catalytic recycle is also catalytically cracked.

In our invention involving both catalytic and thermal treatments the two steps have been combined in a novel and advantageous manner so that a relatively large proportion of the insufficiently converted hydrocarbons from the catalytic treatment is subjected to thermal treatment under conditions which favor the removal of the carbon forming constituents from the insufficiently converted hydrocarbons rather than thermal cracking to gasoline, although some may occur. By this method compounds undesirable in catalytic cracking, because of their tendency to form carbon, such as, for example, diolefins, aromatics, cyclo-olefins, and cyclo-diolefins are probably polymerized or undergo some treatment which converts them to higher boiling hydrocarbons which are removed as residue from the thermal treating system.

In one embodiment the invention comprises fractionating vaporous reaction products formed as hereinafter set forth to separate fractionated vapors, light reflux condensate, and a heavy reflux condensate, commingling a portion of said light reflux condensate with the charging oil and passing the vapors thereof at a cracking temperature in contact with a mass of cracking catalyst, supplying the vaporous portion of the catalytic reaction products to the fractionation step, commingling the residual portion of said light reflux condensate with said heavier reflux condensate and subjecting the mixture to non-catalytic thermal treatment, and supplying the vaporous portion of the non-catalytic thermal reaction products to the fractionation step.

In a more specific embodiment the invention provides for introducing the catalytic conversion products to a vaporizing and separating zone wherein non-vaporous liquid residue is separated from the vaporous reaction products. The vaporous reaction products separated as above mentioned are then commingled with thermally formed reaction products and the mixture fractionated to separate gasoline boiling range hydrocarbons from the heavier insufficiently converted hydrocarbons. The insufficiently converted hydrocarbons are condensed in the fractionator into light reflux condensate having an end boiling point not substantially in excess of 650° F. and a heavier reflux condensate comprising those hydrocarbons boiling above the end point of said light reflux condensate. The vaporizing and separating chamber to which the reaction products from the catalytic conversion step are supplied may be the same chamber to which the reaction products from the non-catalytic thermal step are supplied or, when desired, a separating chamber may be employed for the purpose of separately collecting the catalytic and non-catalytic liquid residue.

The primary object of the invention is to thermally treat insufficiently converted hydrocarbons formed in the process before returning the same to the catalytic conversion step to remove undesirable carbon forming constituents which result in the formation of large amounts of carbonaceous substances if brought in contact with the catalytic material. Preferably also, only light insufficiently converted hydrocarbons are returned to the catalytic conversion step rather than both heavy and light, for we have found that although the charging oil containing heavy ends may be subjected to catalytic conversion, with no particular adverse effect as regards carbon formation and deposition in the catalytic conversion zone, whereas heavy ends of the insufficiently converted products are not as amenable to catalytic conversion and will usually result in the formation of large amounts of carbonaceous substances.

To overcome some of the objectionable features mentioned above, the insufficiently converted hydrocarbons are divided into a light and heavy fraction, a portion of the light fraction being returned to the catalytic conversion step and the residual portion thereof commingled with the heavy fraction and the mixture subjected to thermal treatment. Preferably also, the amount of insufficiently converted hydrocarbons subjected to thermal treatment substantially equals or exceeds in amount the insufficiently converted hydrocarbons returned to the catalytic conversion step whereby at least a portion of the insufficiently converted hydrocarbons receives some thermal treatment before being returned to the catalytic conversion step.

The accompanying diagrammatic drawing illustrates in conventional side elevation one specific form of the apparatus which may be employed to accomplish the objects of the invention.

Referring to the drawing, charging oil comprising, for example, gas oil, kerosene, or naphtha, or any hydrocarbon oil amenable to vapor phase catalytic cracking is supplied through line 1 and valve 2 to pump 3. Pump 3 discharges through line 4 containing valve 5 after which the charging oil is commingled with a portion of light insufficiently converted hydrocarbons separated in the manner to be described. The resulting mixture in line 4 is then introduced to heating coil 6 which receives heat from furnace 7. When desired, steam and/or light gaseous products, the latter comprising either those formed in the process or light gases introduced from an exterior source may be commingled with the mixture of hydrocarbon oil in line 4 to aid in substantially completely vaporizing the hydrocarbon oil supplied to heating coil 6 and also as a means for reducing the total pressure on the hydrocarbon oil. In any event, the mixture supplied to heating coil 6 is substantially completely vaporized therein and heated to a temperature ranging, for example, from 800 to 1200° F. preferably while being maintained under a pressure ranging, for example, from substantially atmospheric to 200 pounds or more per square inch.

The heated reactants leaving coil 6 are directed through line 8 containing valve 9 into reactor 10 which contains catalytic material capable of effecting the desired conversion reaction. In the case here illustrated, reactor 10 may comprise, for example, a zone of the heat exchanger type wherein the catalyst is contained in a plurality of elongated tubular elements of relatively small diameter and wherein provisions are made for passing some suitable heat convective medium such as combustion gases in contact with the exterior of said elongated tubular elements whereby to supply heat to the reactants during conversion and to effect cooling during reactivation of the mass of catalytic material. Reactor 10, on the other hand, may comprise a cylindrical vessel which is well insulated of beds of catalytic material wherein the reaction may be accomplished substantially adiabetically.

In the catalytic cracking of hydrocarbons, relatively large amounts of carbonaceous substances are formed which deposit upon the catalytic material thereby reducing its active surface and necessitating reactivation at periodic frequent intervals. The invention contemplates reactivating the used catalytic material in the usual manner, such as, for example, by passing oxygen-containing reactivating gases in contact with the used catalytic material and removing carbonaceous substances as combustion gases along with the spent reactivating gases. It is desirable, therefore, in order that the operation may be carried out as a continuous process to employ at least two reactors and in some instances more than two reactors so that while the catalytic material in one or more reactors is being used for effecting conversion of the hydrocarbon reactants the catalytic material in the other or others may be undergoing reactivation.

Catalysts which have been found to be effective in the catalytic cracking of hydrocarbon vapors may comprise pellets or granules of silica or other siliceous and refractory materials composited with compounds selected from the group consisting of alumina, zirconia, vanadia, and thoria. In addition, the hydrosilicates of alumina, acid treated clays, or the like, have also been found to be effective in the cracking treatment of hydrocarbon vapors. Although the catalysts above recited are generally considered to be the preferred catalysts their use is not to be construed as a limiting feature, for various other catalysts well known to those in the art may be employed within the broad scope of the invention.

The catalytic reaction products leaves reactor 10 by way of line 11 and may be directed through valve 12 into vaporizing and separating chamber 13 where they commingle with the thermally formed reaction products supplied to this chamber in the manner to be described. Chamber 13, together with the fractionator and condensing and collecting equipment in communication with the latter, may be operated at a pressure ranging, for example, from substantially atmospheric to 200 pounds or more per square inch. Vaporous reaction products and liquid reaction products are separated in chamber 13 and the latter substantially further vaporized to form a non-vaporous liquid residue which is removed by way of line 14 containing valve 15, recovered as a product of the process or subjected to any desired further treatment.

Vaporous reaction products, together with vapors evolved within chamber 13, are directed through line 16 containing valve 17 into fractionator 54. In some instances, particularly when it is desirable to separately collect the catalytic and non-catalytic liquid residue, catalytic reaction products in line 11 may be directed through line 18 containing valve 19 into vaporizing and separating chamber 20 which may be operated under a pressure of approximately the same order as that mentioned in connection with chamber 13. Vaporous reaction products are separated from the non-vaporous liquid residue in chamber 20 and the latter removed by way of line 21 containing valve 22, recovered as a product of the process or subjected to any desired further treatment. Vaporous reaction products separated in chamber 20 are directed through line 23 containing valve 24 into line 16 where they commingle with the vaporous reaction products from chamber 13, after which the mixture is supplied to fractionator 54.

Vaporous reaction products supplied to fractionator 54 are fractionated therein to separate fractionated vapors boiling substantially in the range of gasoline from the higher boiling insufficiently converted hydrocarbons and the latter condensed in the fractionator as reflux condensate. Fractionated vapors separated in fractionator 54 are conducted through line 25 containing valve 26 to cooling and condensation in condenser 27. The distillate, together with undissolved and uncondensed gases from condenser 27, is directed through line 28 containing valve 29 into receiver 30 wherein the distillate and gases are collected and separated. Undissolved and uncondensed gases collected and separated in receiver 30 are removed therefrom by way of line 31 containing valve 32, recovered as a product of the process or, as above mentioned, a portion thereof may be commingled with the mixture of hydrocarbons subjected to catalytic conversion, the residual portion in such a case being recovered or subjected to any desired further treatment. A portion of the distillate collected and separated in receiver 30 may be returned to the upper portion of fractionator 54 by well known means, not shown, as a refluxing and cooling medium while the residual portion thereof is removed from receiver 30 by way of line 33 containing valve 34, recovered as a product of the process or subjected to any desired further treatment.

Reflux condensate condensed in fractionator 54 is separated therein into a light reflux condensate having an end boiling point preferably below 650° F., and a heavy reflux condensate comprising the residual portion of the insufficiently converted hydrocarbons. Light reflux condensate from the fractionator 54 is directed through line 35 containing valve 36 to pump 37. Pump 37 discharges through line 38 and a portion of the light reflux condensate is directed through valve 39 into line 4 where it commingles with the charging oil for treatment in the manner previously described. The residual portion of the light reflux condensate in line 38 is directed through line 40 containing valve 41 into line 42 where it commingles with the heavy reflux condensate removed from fractionator 54 by way of line 42 and valve 43 and the mixture thus formed is supplied to pump 44. The ratio in which light reflux condensate may be mixed for subsequent catalytic treatment without obtaining unusually large amounts of carbon deposition will vary depending upon the type of charging oil and the conditions of operation. Generally, however, to obtain the best results the amount of insufficiently converted hydrocarbons subjected to thermal treatment is equal to and preferably greater than the amount of light reflux condensate commingled with the charging oil. As another criterion for determining the optimum blending ratio of light reflux condensate and charging oil, it may be said that the combined feed rate to the catalytic conversion step is preferably below 3, (i. e. 2 volumes of reflux per volume of charge) and for best results 2 or less.

The mixture of heavy and light reflux condensate supplied to pump 44 is discharged through line 45 containing valve 46 into heating coil 47 which receives heat from furnace 48. The hydrocarbons in passing through coil 47 are subjected to temperature and pressure conditions selected to favor reactions which tend to convert the undesirable carbon forming constituents present therein into heavier hydrocarbons which are removed as liquid residue in the vaporizing and separating chamber. Temperatures to which the oil may be heated in coil 47 may range, for example, from 800 to 1000° F., while employing a superatmospheric pressure ranging from 100 to 1000 pounds or more per square inch.

The heated products leaving coil 47 are directed through line 49 containing valve 50 into reaction chamber 51. Reaction chamber 51 is preferably operated under a super-atmospheric pressure substantially equal to or slightly less than that employed in coil 47 and may be insulated to reduce radiation losses therefrom, although no insulation appears in the drawing. Reaction products leaving chamber 51 are directed through line 52 containing valve 53 into chamber 13 for treatment in the manner previously described. In some cases, the use of chamber 51 may be obviated by providing a sufficient soaking time in coil 47 for the desired reaction to be accomplished, and in such cases the reaction products leaving this coil may be introduced directly to chamber 13, and since means for accomplishing this are well known, such means are not illustrated.

An example of one specific operation of the process as it may be accomplished in an apparatus such as illustrated and above described is approximately as follows: Charging stock comprising a 33° A. P. I. gravity Mid-Continent gas oil is commingled with approximately an equal amount of reflux condensate separated in the manner to be described and the mixture heated and vaporized at a temperature of 960° F. The heated vapors under a superatmospheric pressure of approximately 30 pounds per square inch are passed in contact with a mass of silica-alumina-zirconia catalyst.

The reaction products are supplied to a vaporizing and separating chamber operated at a superatmospheric pressure of 20 pounds per square inch wherein non-vaporous liquid residue is separated from the vaporous reaction products and the former recovered as a product of the process. The vaporous reaction products separated as above mentioned are commingled with other vaporous reaction products formed in the manner to be described and the mixture fractionated to separate fractionated vapors of approximately 400° F. end point from the higher boiling insufficiently converted hydrocarbons. The fractionated vapors are subjected to cooling and condensation and the resulting distillate and gas collected and separated.

The insufficiently converted hydrocarbons separated as above mentioned are condensed in the fractionator into a light reflux condensate having an end boiling point of approximately 525° F., and a heavy reflux condensate comprising the residual portion of the insufficiently converted hydrocarbons. A portion of the light reflux condensate is commingled with the charging stock as previously mentioned and the residual portion thereof is commingled with the heavy reflux condensate and the mixture subjected to thermal treatment in a heating coil and communicating reaction chamber at a temperature of 960° F., and under a superatmospheric pressure of 300 pounds per square inch. The reaction products leaving the reaction chamber are supplied to a vaporizing and separating chamber separate from the first mentioned vaporizing and separating chamber wherein the non-vaporous liquid residue is separated from the vaporous reaction products, the former recovered and the latter subjected to fractionation in the manner previously described.

From an operation employing conditions as above described one may obtain approximately 71.5% of 400° F. end point gasoline having an octane rating of 75.5, approximately 10% of thermally formed non-vaporous liquid residue, approximately 3.4% of catalytically formed liquid residue, the balance being carbon, gas and loss.

We claim as our invention:

1. A process for the conversion of hydrocarbon oil which comprises passing vapors of said hydrocarbon oil at a cracking temperature in contact with a mass of cracking catalyst, fractionating the resulting cracked vapors to form light reflux condensate, and a heavier reflux condensate, supplying at least a portion of said light reflux condensate to the catalytic conversion step, commingling the remaining portion of said light reflux condensate with said heavier reflux condensate and subjecting the mixture to non-catalytic thermal cracking treatment, supplying cracked vapors from said non-catalytic thermal cracking treatment to the fractionation step and therein fractionating the same in combined state with the first mentioned cracked vapors, and finally condensing the fractionated vapors.

2. A process for the conversion of hydrocarbon oil which comprises heating and vaporizing said hydrocarbon oil and passing the heated vapors at a cracking temperature in contact with a mass of cracking catalyst, fractionating the resulting cracked vapors to form light reflux condensate, and a heavier reflux condensate, supplying at least a portion of said light reflux condensate to the catalytic conversion step, commingling another portion of said light reflux condensate with said heavier reflux condensate and subjecting the mixture to non-catalytic thermal cracking treatment, supplying cracked vapors from said non-catalytic thermal cracking treatment to the fractionation step and therein fractionating the same in combined state with the first mentioned cracked vapors, and finally condensing the fractionated vapors.

3. A process for the conversion of hydrocarbon oil which comprises passing vapors of said hydrocarbon oil at a cracking temperature in contact with a mass of cracking catalyst, supplying the resulting cracked products to a vaporizing and separating step and therein separating non-vaporous liquid residue from cracked vapors, fractionating said cracked vapors to form light reflux condensate, and a heavier reflux condensate, dividing the light reflux condensate into portions of like composition, supplying one of said portions to the catalytic conversion step, commingling another of said portions with said heavier reflux condensate and subjecting the mixture to non-catalytic thermal cracking treatment, supplying the resulting cracked products from said non-catalytic thermal cracking treatment to the vaporizing and separating step, and finally condensing the fractionated vapors.

4. A process for the conversion of hydrocarbon oil which comprises passing vapors of said hydrocarbon oil at a cracking temperature in contact with a mass of cracking catalyst, supplying the resulting cracked products to a vaporizing and separating step and therein separating non-vaporous liquid residue from cracked vapors, fractionating said cracked vapors to form light reflux condensate, and a heavier reflux condensate, supplying at least a portion of said light reflux condensate to the catalytic conversion step, commingling the remaining portion of said light reflux condensate with said heavier reflux condensate and subjecting the mixture to non-catalytic thermal cracking treatment, supplying the resulting cracked products from said non-catalytic thermal cracking treatment to a vaporizing and separating step separate from the first mentioned vaporizing and separating step and therein separating non-vaporous liquid residue from thermally cracked vapors, supplying said thermally cracked vapors to the fractionation step, and finally condensing the fractionated vapors.

5. A process for the conversion of hydrocarbon oil which comprises passing vapors of said hydrocarbon oil at a cracking temperature in contact with a mass of cracking catalyst, fractionating the resulting cracked vapors to form light reflux condensate having an end boiling point not substantially in excess of 650° F., and a heavier reflux condensate consisting essentially of higher boiling insufficiently converted hydrocarbons, supplying at least a portion of said light reflux condensate to the catalytic conversion step, commingling the remaining portion of said light reflux condensate with said heavier reflux condensate and subjecting the mixture to non-catalytic thermal cracking treatment, supplying cracked vapors from said non-catalytic thermal cracking treatment to the fractionation step and therein fractionating the same in combined state with the first mentioned cracked vapors, and finally condensing the fractionated vapors.

6. A process for the conversion of hydrocarbon oil which comprises passing vapors of said hydrocarbon oil at a cracking temperature in contact with a mass of catalyst of the silica-alumina-zirconia type, fractionating the resulting cracked vapors to form light reflux condensate, and a heavier reflux condensate, supplying at least a portion of said light reflux condensate to the catalytic conversion step, commingling another portion of said light reflux condensate with said heavier reflux condensate and subjecting the mixture to non-catalytic thermal cracking treatment, supplying cracked vapors from said non-catalytic thermal cracking treatment to the fractionation step and therein fractionating the same in combined state with the first mentioned cracked vapors, and finally condensing the fractionated vapors.

7. The process of claim 3 further characterized in that said light reflux condensate comprises a fraction having an end boiling point not substantially in excess of 650° F.

ROLAND B. DAY.
ELMER R. KANHOFER.

CERTIFICATE OF CORRECTION.

Patent No. 2,344,290. March 14, 1944.

ROLAND B. DAY, ET AL.

It is hereby certified that error appears in the printed specification of the above numbered patent requiring correction as follows: Page 4, first column, lines 17 and 18, claim 1, strike out the words "oil which comprises passing vapors of said hydrocarbon oil at a cracking temperature in contact" and insert the same after "hydrocarbon" in line 14, same claim; and that the said Letters Patent should be read with this correction therein that the same may conform to the record of the case in the Patent Office.

Signed and sealed this 30th day of May, A. D. 1944.

Leslie Frazer

(Seal) Acting Commissioner of Patents.